(12) United States Patent
Buracchini et al.

(10) Patent No.: US 8,295,852 B2
(45) Date of Patent: Oct. 23, 2012

(54) METHOD AND SYSTEM FOR ENABLING CONNECTION OF A MOBILE COMMUNICATION TERMINAL TO A RADIO COMMUNICATION NETWORK

(75) Inventors: Enrico Buracchini, Turin (IT); Alessandro Trogolo, Turin (IT); Paolo Goria, Turin (IT)

(73) Assignee: Telecom Italia S.p.A., Milan (IT)

( * ) Notice: Subject to any disclaimer, the term of this patent is extended or adjusted under 35 U.S.C. 154(b) by 363 days.

(21) Appl. No.: 12/450,514

(22) PCT Filed: Mar. 30, 2007

(86) PCT No.: PCT/EP2007/053067
§ 371 (c)(1),
(2), (4) Date: Sep. 29, 2009

(87) PCT Pub. No.: WO2008/119381
PCT Pub. Date: Oct. 9, 2008

(65) Prior Publication Data
US 2010/0093340 A1    Apr. 15, 2010

(51) Int. Cl.
H04W 24/00    (2009.01)
H04W 36/00    (2009.01)
(52) U.S. Cl. ..................... 455/456.1; 455/436
(58) Field of Classification Search .... 455/456.1–456.6, 455/436–444; 370/331
See application file for complete search history.

(56) References Cited

U.S. PATENT DOCUMENTS

| | | | |
|---|---|---|---|
| 5,301,359 | A | 4/1994 | Van den Heuvel et al. |
| 2004/0176024 | A1 | 9/2004 | Hsu et al. |
| 2004/0218605 | A1 | 11/2004 | Gustafsson et al. |
| 2005/0037770 | A1 | 2/2005 | Takeda et al. |
| 2006/0030266 | A1* | 2/2006 | Desai et al. ................. 455/41.2 |
| 2007/0032219 | A1* | 2/2007 | Rudolf et al. .............. 455/404.1 |
| 2007/0093201 | A1* | 4/2007 | Hsu et al. .................... 455/3.04 |

(Continued)

FOREIGN PATENT DOCUMENTS

EP    1 482 753 A2    12/2004

(Continued)

OTHER PUBLICATIONS

Cordier, P. et al., "Cognitive Pilot Channel," Wireless World Research Forum #15, pp. 1-6, (2005).

(Continued)

*Primary Examiner* — Michael Faragalla
(74) *Attorney, Agent, or Firm* — Finnegan, Henderson, Farabow, Garrett & Dunner, L.L.P.

(57) ABSTRACT

A method for enabling connection of a mobile communication terminal to a radio communication network, includes: receiving information about available radio access networks available in a geographic area; determining a current location of the mobile communication terminal within the geographic area; based on the received information and the determined mobile communication terminal current location, determining available radio access networks covering the current mobile communication terminal location, and attempting to establish a connection to the radio communication network through a selected one of the available radio access networks. In case the current location of the mobile communication terminal within the geographic area cannot be determined, attempting to establish a direct connection with a neighboring mobile communication terminal over a short-range wireless communication channel; obtaining from the neighboring mobile communication terminal information about available radio access networks; and attempting to establish a connection to the radio communication network through a selected one of the available radio access networks specified in the information obtained from the neighbor mobile communication terminal.

25 Claims, 8 Drawing Sheets

U.S. PATENT DOCUMENTS

2010/0103873 A1    4/2010    Burracchini et al.

FOREIGN PATENT DOCUMENTS

| GB | 2 313 257 A | 11/1997 |
| GB | 2 410 153 A | 7/2005 |
| WO | WO 90/13211 | 11/1990 |
| WO | WO 01/45446 A1 | 6/2001 |
| WO | WO 2004/077753 A2 | 9/2004 |
| WO | WO 2006/020168 A2 | 2/2006 |
| WO | WO 2006/045334 | 5/2006 |
| WO | WO 2006/064302 | 6/2006 |
| WO | WO 2008/119380 A1 | 10/2008 |

OTHER PUBLICATIONS

Le, L. T. et al., "Performance of an Accessing and Allocation Scheme for the Download Channel in Software Radio", Wireless Communications and Networking Conference, vol. 2, pp. 517-521 (2000).

Houzé, P. et al., "Common Pilot Channel for Network Selection," XP-002411303, IEEE Vehicular Technology Conference, xx, pp. 67-71, (2006).

Buracchini, E. et al., "Method and System for Enabling Connection of a Mobile Communication Terminal to a Radio Communication Network," U.S. Appl. No. 12/450,518, filed Sep. 29, 2009.

* cited by examiner

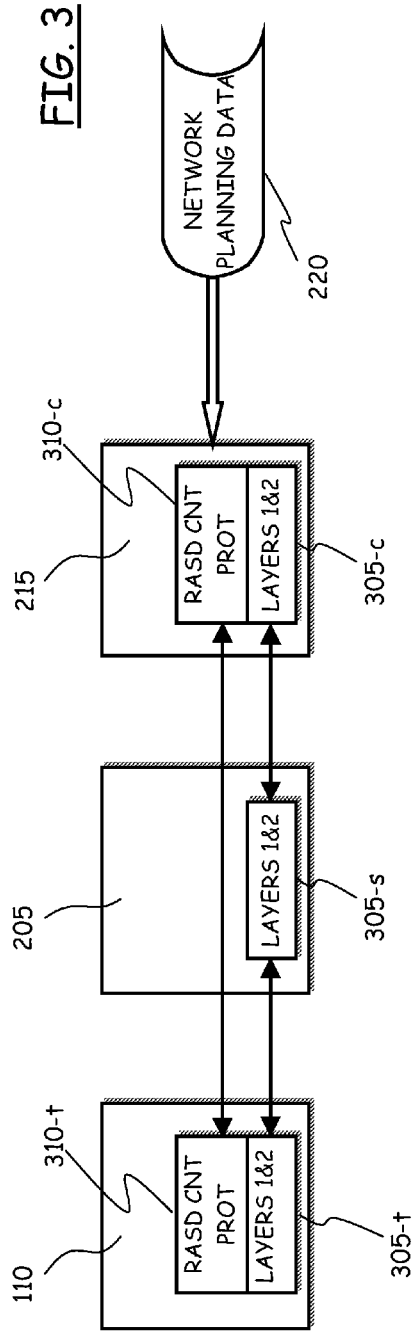
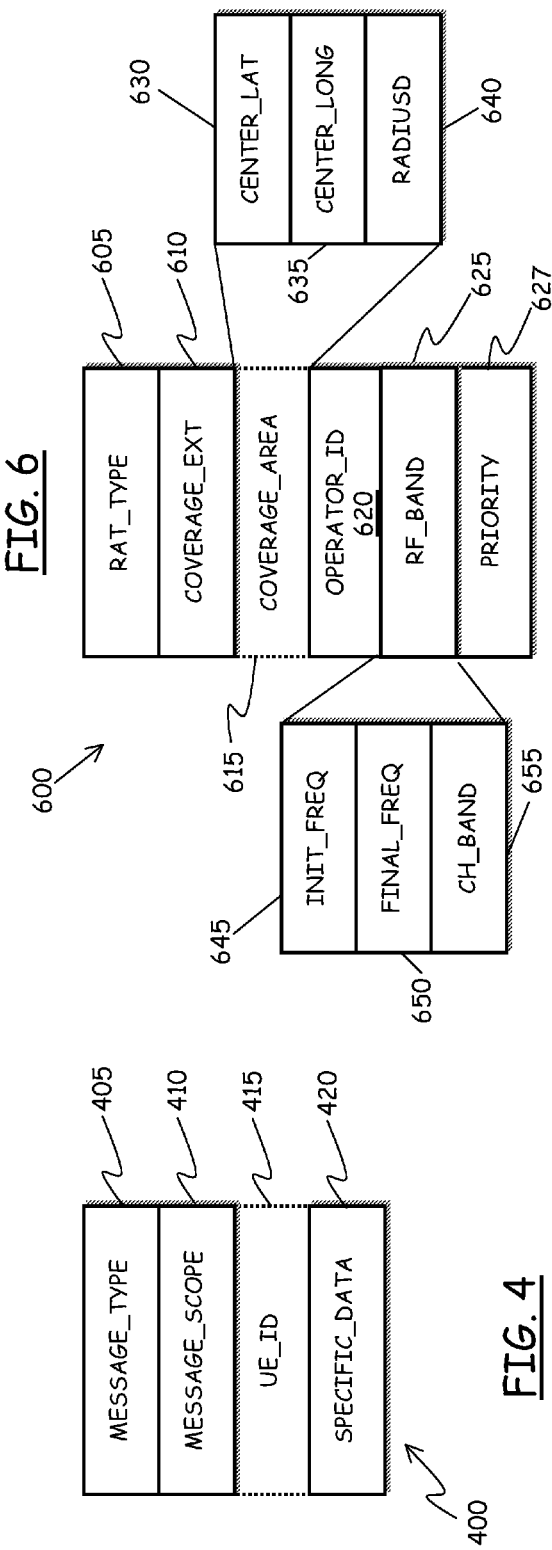

METHOD AND SYSTEM FOR ENABLING CONNECTION OF A MOBILE COMMUNICATION TERMINAL TO A RADIO COMMUNICATION NETWORK

CROSS REFERENCE TO RELATED APPLICATION

This application is a national phase application based on PCT/EP2007/053067, filed Mar. 30, 2007.

BACKGROUND OF THE INVENTION

1. Field of the Invention

The present invention relates generally to the field of radio communication networks, broadly considered, including mobile telephony networks and wireless data networks. More particularly, the present invention relates to the aspects of how mobile communication terminals, e.g. mobile phones, get connected to radio communication networks.

2. Description of the Related Art

Heterogeneous radio communication contexts are becoming more and more common, due to the introduction of new communication technologies and standards.

An heterogeneous radio communication context is a geographic area in which two or more different radio communication networks coexist, compliant to different standards, like for example one or more GSM (Global System for Mobile communication) networks, one or more GPRS (General Packet Radio Service) networks, one or more UMTS (Universal Mobile Telecommunication System) networks, one or more WLAN (Wireless Local Area Network) or other types of wireless data networks, where the different radio communication networks may belong to a same or to different telecom service providers.

Since different radio communication systems usually differ from each other even at the lowermost layers of the communication protocol, particularly at the physical, data link, network and transport layers, an heterogeneous radio communication context is very often a multi-RAT (Radio Access Technology) context.

Multi-mode mobile communication terminals are known in the art, and already on the market, that can work in an heterogeneous radio communication network context: for example, dual-mode mobile phones support both the UMTS and the GSM standards.

Also known in the art are reconfigurable mobile communication terminals, which, in use, can be reconfigured to change the supported radio communication standard (for example, a reconfigurable mobile communication terminal that, at a certain time, is configured to support the GSM standard, may be reconfigured to support the UMTS standard).

In an heterogeneous, or multi-RAT, context, a multi-mode and/or reconfigurable mobile communication terminal has to be able to connect to the most appropriate RAT. When turned on, the mobile communication terminal is not aware of which is the most appropriate RAT in that geographic area where it is located, or which frequency ranges the RATs existing in that specific geographic area exploit; this latter aspect is particularly critical in case DSA (Dynamic Spectrum Allocation) or FSM (Flexible Spectrum Management) techniques are implemented, because in these cases the frequency ranges of the RATs are not established a priori, being susceptible of varying in time, according, for example, to the network operator preferred policies. The mobile communication terminal should thus scan the entire frequency range in order to detect which are the available RATs at its current location, with a significant impact on the time required by the terminal for camping, and a great consumption of power, a resource which is precious in battery-operated hand-held devices like the mobile communication terminals.

In L. T. Le and A. H. Aghvami, "Performance of an accessing and allocation scheme for download channel in SDR", Wireless Communications and Networking Conference, Chicago, 2000, Volume 2, pages 517-521, a scheme of a communication channel called GPDCH (Global Pilot and Download CHannel) is presented, to be used for the exchange of all the broadcast and signalling messages, and for the procedures of software download for the reconfiguration of reconfigurable mobile communication terminals. The availability of a communication channel in a frequency band known a priori facilitates the task of the mobile communication terminal, which can derive from the messages sent over such a channel indications about which are the available RATs, the respective frequency bands, the different telecom operators.

In the document "Cognitive Pilot Channel" by P. Cordier et al, Wireless World Research Forum #15, 8-9 Dec. 2005, Paris, two possible solutions are presented for setting up a communication channel, the so-called "CPC" ("Cognitive Pilot Channel"), for providing sufficient information to mobile terminals, helping the connection thereof to the most appropriate network, by broadcasting relevant information with regard to frequency bands, RATs, services, load situation etc.

According to a first proposed solution, the CPC is broadcast on a wide zone including a great number of distinct meshes; the CPC contains the data for all the meshes of this area; for each mesh, the CPC contains the operators available at that mesh, their preferred technologies and the corresponding frequency bands. A terminal located in a certain mesh switches on; it determines by itself its localization, using the GPS (Global Positioning System); thanks to the knowledge of its position, the terminal is able to extract from the CPC the information on the technologies available in its mesh, the operators deploying these RATs and the corresponding frequency bands. The terminal thus establishes its connection with the relevant operator and the network.

A second solution proposed in the document of P. Cordier et al is for a CPC having a multi-level hierarchical structure, with a country level CPC (level 1), an operator level CPC (level 2) and a network level CPC (level 3). Level 1 CPC indicates who (operators) are nearby the mobile terminal region and at which frequency is the level 2 CPC being operated; level 2 CPC informs which RAT at which frequency is operated by the operator; level 3 CPC indicates the RAT information.

Similarly to the paper of P. Cordier et al. cited above, in P. Houzé et al., "Common Pilot Channel for network selection", VTC 2006-Spring, 2006 IEEE 63rd Vehicular Technology Conference, May 2006, pages 67-71, the idea to have a common pilot channel (CPC) in a harmonized frequency band to initiate the connection with the available network is described. The area covered by one broadcast channel is divided into meshes, and, for each mesh, each operator includes the corresponding information: the available technologies and the corresponding frequency bands.

SUMMARY OF THE INVENTION

The Applicant has found that while the idea of exploiting a channel like the CPC for facilitating the camping of mobile terminals to a network is good, the proposed solutions for implementing and using such a channel are not satisfactory.

In particular, a critical aspect is the determination of the position of the mobile communication terminal; positioning systems like the GPS, while working well in outdoor environments, may fail in indoor environments, for example when the mobile communication terminal is within a building, which shields the GPS signal. It may thus happen that, when located inside a building, the mobile communication terminal is not be able to exploit the information transported over the CPC to accomplish the connection to the more appropriate RAT.

The Applicant has found that a solution to the this problem can be to have a mobile communication terminal which is not able to determine its current location, and has no information about the available radio access networks, ask for help to neighboring mobile communication terminals, using a short-range wireless communication channel.

For the purposes of the present invention, neighboring means other mobile communication terminals, or similar devices, that are relatively close, at a relatively short distance from the considered mobile communication terminal, such that the latter can reach the neighboring mobile communication terminal directly, exploiting a short-range wireless communication channel, e.g. a short-range radio channel, using for example a Bluetooth interface, a ZigBee interface, a HomeRF interface, an InfraRed (IR) interface. The distance at which the neighboring mobile communication terminal should be from the considered mobile communication terminal in order to be reached by means the short-range wireless channel depends primarily on the type of short-range wireless channel used; for example, the neighboring mobile communication terminal may be located in a range of distances up to a hundred meters.

According to an aspect of the present invention, a method is provided for enabling connection of a mobile communication terminal to a radio communication network, comprising:
  receiving information about available radio access networks available in a geographic area;
  determining a current location of the mobile communication terminal within said geographic area;
  based on the received information and the determined mobile communication terminal current location, determining available radio access networks covering the current mobile communication terminal location, and
  attempting establishing a connection to the radio communication network through a selected one of said available radio access networks,
  in case the current location of the mobile communication terminal within said geographic area cannot be determined:
    attempting establishing a direct connection with a neighboring mobile communication terminal over a short-range wireless communication channel;
    obtaining from the neighboring mobile communication terminal information about available radio access networks; and
    attempting establishing a connection to the radio communication network through a selected one of the available radio access networks specified in the information obtained from the neighbor mobile communication terminal.

Said short-range wireless communication channel may be a short-range radio channel; the short-range wireless communication channel may be a channel selected from the group consisting of Bluetooth, ZigBee, HomeRF, IR communication channel.

Said information about available radio access networks available in a geographic area may in particular be received over a broadcast communication channel.

Said obtaining from the neighboring mobile communication terminal information about available radio access networks may comprise obtaining, for each of the available radio access networks, an indication of a type of the radio access technology of the radio access network, and an indication of a frequency band used by the radio access network.

Prior to said attempting establishing a direct connection with a neighboring mobile communication terminal over a short-range wireless communication channel, a presence may be ascertained, in a memory of the mobile communication terminal, of previously received information about available radio access networks, and attempting establishing a connection to the radio communication network through a selected one of the available radio access networks specified in the previously received information.

In case said obtaining from the neighboring mobile communication terminal information about available radio access networks fails, a network function in the radio communication network may be contacted to get information about the available radio access networks covering the current mobile communication terminal location. Responsive to said contacting, the network function may: determine the mobile communication terminal current location within the geographic area; determine the available radio access networks covering the current mobile communication terminal location; and send to the mobile communication terminal information about the determined available radio access networks. The mobile communication terminal current location within the geographic area may be determined exploiting a radio triangulation technique.

Said attempting establishing a connection to the radio communication network may comprise: in case the mobile communication terminal is not configured for the operation with the selected radio access network, re-configuring the mobile communication terminal. Said re-configuring the mobile communication terminal may comprise downloading other the air data for the re-configuring of the mobile communication terminal.

Said information about available radio access networks may includes at least one radio access network available in said geographic area, and, for the at least one radio access network, data adapted to determine an extent of coverage of the geographic area by that radio access network. In case more than one radio access networks are available, a list of radio access networks available in said geographic area may be provided.

Said data adapted to determine an extent of coverage of the geographic area by that radio access network may include geographic coordinates of at least one geographic point in said geographic area; said data may further include an indication of length. Said geographic coordinates of at least one geographic point may define a geographic position of a center of a circle, and said indication of length defines a radius of the circle, said circle describing the extent of coverage of the geographic area by that radio access network. Said data adapted to determine an extent of coverage of the geographic area by that radio access network may also include geographic coordinates of at least two geographic points in the geographic area, defining vertex of a polygon describing the extent of coverage of the geographic area. In case the radio access network covers the whole geographic area, said data adapted to determine an extent of coverage of the geographic area by that radio access network may include an indication that the radio access network covers the whole geographic area; said indication of at least one radio access networks available in said geographic area may include an identifier of the radio access network.

Said broadcast communication channel may include an out-band broadcast communication channel, located in a frequency band external to licensed bands assigned to the radio access networks present in said geographic area of interest. Alternatively, said broadcast communication channel may include an in-band broadcast communication channel, located in a frequency band within licensed bands assigned to the radio access networks present in said geographic area of interest; said in-band broadcast communication channel may be defined as a logical channel of one of the radio access networks present in said geographic area of interest.

According to a second aspect of the present invention, a mobile communication terminal is provided, adapted to:
  receive information about available radio access networks of a radio communication network, available in a geographic area;
  determine its current location within said geographic area;
  based on the received information and the determined current location, determine available radio access networks covering the current location, and
  attempting establishing a connection to the radio communication network through a selected one of said available radio access networks,
  and, in case the current location of the mobile communication terminal within said geographic area cannot be determined, further adapted to:
    attempt establishing a direct connection with a neighboring mobile communication terminal over a short-range wireless communication channel;
    obtain from the neighboring mobile communication terminal information about available radio access networks; and
    attempt establishing a connection to the radio communication network through a selected one of the available radio access networks specified in the information obtained from the neighbor mobile communication terminal.

Said short-range wireless communication channel may be a short-range radio channel; particularly it can be a communication channel selected from the group consisting of Bluetooth, ZigBee, HomeRF, IR communication channel.

In order to obtain from the neighboring mobile communication terminal information about available radio access networks, the mobile communication terminal may be further adapted to:
  obtain, for each of the available radio access networks, an indication of a type of the radio access technology of the radio access network, and an indication of a frequency band used by the radio access network.

Prior to said attempting establishing a direct connection with a neighboring mobile communication terminal over a short-range radio channel, the mobile communication terminal may ascertain a presence, in a memory of the mobile communication terminal, of previously received information about available radio access networks, and attempting establishing a connection to the radio communication network through a selected one of the available radio access networks specified in the previously received information.

In case said obtaining from the neighboring mobile communication terminal information about available radio access networks fails, the mobile communication terminal may contact a network function in the radio communication network to get information about the available radio access networks covering the current mobile communication terminal location.

For said attempting establishing a connection to the radio communication network the mobile communication terminal may be further adapted to: in case the mobile communication terminal is not configured for the operation with the selected radio access network, re-configuring the mobile communication terminal. For said re-configuring, the mobile communication terminal may be further adapted to download other the air data for the re-configuring of the mobile communication terminal.

According to a third aspect of the present invention, a radio communication network is provided, comprising a network function adapted to broadcast information about available radio access networks available in a geographic area covered by the radio communication network, wherein said network function is further adapted to receiving from a mobile communication terminal a request of providing information about the available radio access networks covering the current mobile communication terminal location.

Said information about available radio access networks may include at least one radio access network available in said geographic area, and, for the at least one radio access network, data adapted to determine an extent of coverage of the geographic area by that radio access network. In case more than one radio access networks are available, includes a list of radio access networks available in said geographic area may be provided.

Said data adapted to determine an extent of coverage of the geographic area by that radio access network may include geographic coordinates of at least one geographic point in the geographic area, and, possibly, an indication of length. Said geographic coordinates of at least one geographic point may define a geographic position of a center of a circle, and said indication of length defines a radius of the circle, said circle describing the extent of coverage of the geographic area by that radio access network. Said data adapted to determine an extent of coverage of the geographic area by that radio access network may also include geographic coordinates of at least two geographic points, defining vertex of a polygon describing the extent of coverage of the geographic area.

Said network function may be further adapted to: determine the mobile communication terminal current location within the geographic area, for example exploiting a radio triangulation technique; determine the available radio access networks covering the current mobile communication terminal location; and send to the mobile communication terminal information about the determined available radio access networks.

BRIEF DESCRIPTION OF THE DRAWINGS

The features and advantages of the present invention will be made apparent by reading the following detailed description of an embodiment thereof, provided merely by way of non-limitative example, description that will refer to the annexed drawings, wherein:

FIG. 3 shows the architecture of a communication protocol according to an embodiment of the present invention;

FIG. 4 schematically shows a general structure of a message of a communication protocol according to an embodiment of the present invention;

FIG. 6 schematically shows the structure of a portion of a first type of message of the communication protocol according to an embodiment of the present invention;

DETAILED DESCRIPTION OF THE PREFERRED EMBODIMENT

Figure 1:
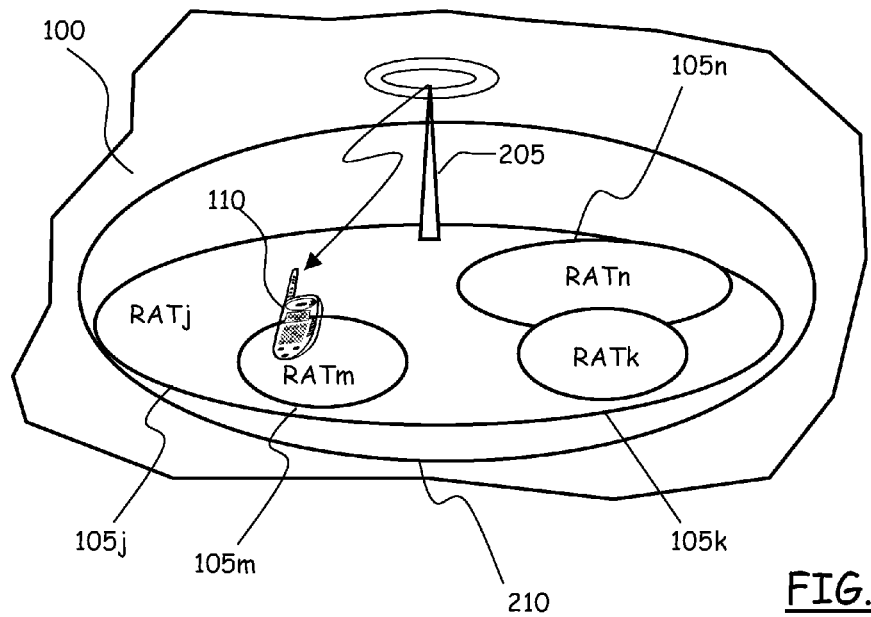
FIG. 1 schematically shows an heterogeneous or multi-RAT radio communication network context where the present invention is advantageously applied.

Referring to the drawings, in FIG. 1 an heterogeneous or multi-RAT radio communication context is schematically depicted, where the present invention is advantageously applied. A geographic area of interest 100 is covered, in terms of radio signals, by two or more, in the shown example four different Radio Access Networks (RANs), implementing different RATs RATj, RATk, RATm, RATn, managed by a same or by different telecom operators. The different RATs may for example include a GSM RAT, a GSM/GPRS RAT, a GSM/GPRS/EDGE RAT, a UMTS FDD (Frequency Division Duplexing) RAT, a UMTS TDD (Time Division Duplexing) RAT, a WLAN (e.g., IEEE 802.11a/b/g) RAT, a CDMA2000 RAT, an IS-95 RAT. The number and specific type of RANs are not limitative to the present invention. Each RAN has a respective area of coverage $105j$, $105k$, $105m$, $105n$, which depends on the deployment choices of the telecom operator owner of said RAN.

Reference numeral 110 denotes a multi-mode and/or reconfigurable mobile communication terminal capable of operating with different RATs, particularly with two or more of the four different RATs RATj, RATk, RATm, RATn.

Generally, in order to connect to a network belonging to the heterogeneous radio communication context, the mobile terminal 110 needs to know which are the available RATs at the current mobile terminal location, and to select the most appropriate RAT; in case the mobile terminal is a reconfigurable terminal, and the available RATs are not supported by its current configuration, the mobile terminal may download the software required for changing its configuration. A reconfigurable terminal is for example described in the published International application WO 2006/045334, which is incorporated herein by reference.

According to the present invention, a dedicated communication channel, hereinafter referred to as the Radio Aware and Software Download (RASD) channel, and a related communication protocol are set up to convey, through the geographic area of interest 100, information that is exploited by the mobile communication terminals to facilitate the task of connecting to the heterogeneous radio communication network.

Figure 2:
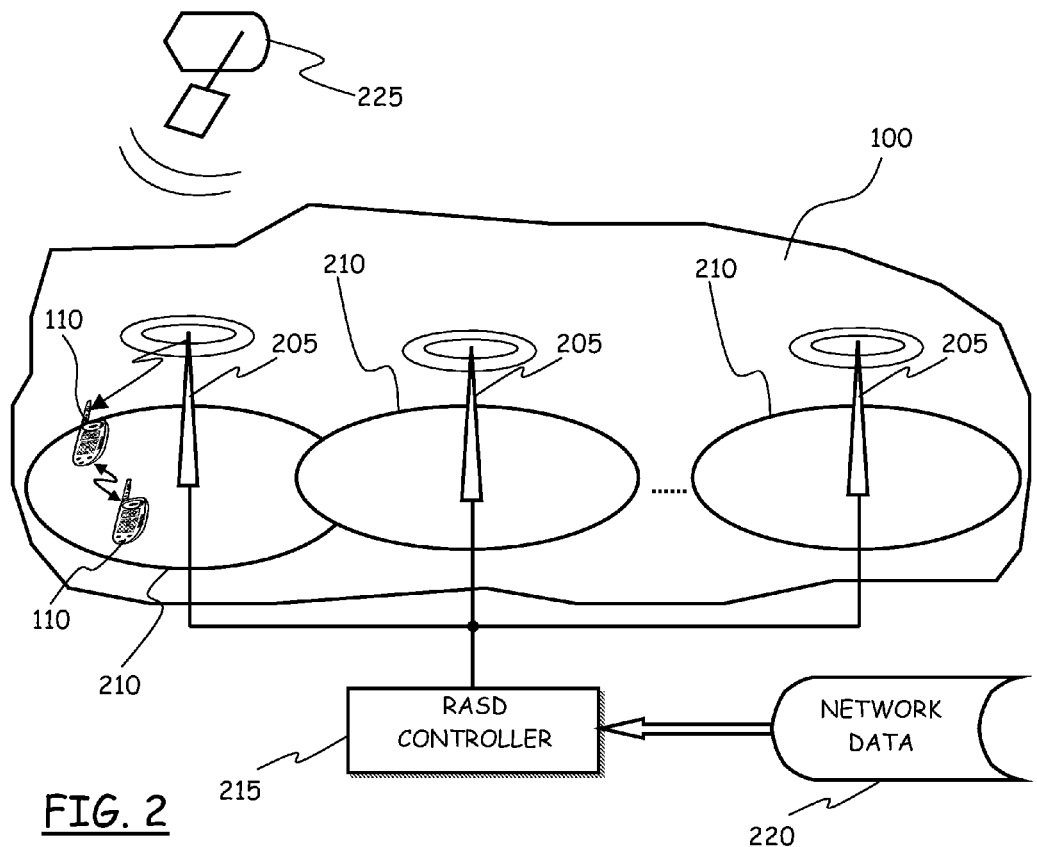
FIG. 2 schematically shows the architecture of a system according to an embodiment of the present invention.

FIG. 2 shows, in terms of functional blocks, the architecture of a system according to an embodiment of the present invention. A plurality of RASD transceiver nodes or stations 205 are deployed through the geographic area of interest 100, for transmitting/receiving over the RASD channel; the generic transceiver station 205 has a respective radio coverage area 210. The RASD transceiver stations 205 are for example transceiver stations similar to the base stations of the mobile telephony networks, like the BTSs (Base Transceiver Stations) of the GSM or the Node-Bs of the UMTS or the reconfigurable MSBSs (Multi-Standard Base Stations). The RASD transceiver stations 205 may also be co-located with the transceiver stations of the different RATs of the heterogeneous network.

The RASD transceiver stations 205 are in wireless and/or wired communication relationship with a RASD controller node 215. The RASD controller node 215 implements a network function responsible of managing the information content to be transmitted by the RASD transceiver stations 205; the RASD controller node 215 may also be responsible of managing messages carrying information requests issued by the mobile communication terminals 110 and transmitted over the RASD channel, particularly requests of information about the coverage of the area of interest 100 by the RATs of the heterogeneous radio communication context, as will be described in detail later; furthermore, the RASD controller node 215 may be responsible of handling the download to the reconfigurable mobile communication terminals of operative software adapted to reconfigure them in order to make the mobile communication terminals adapted to operate with the RATs existing at the mobile terminal current location.

The RASD controller node 215 may derive the information about the different RATs existing in the area of interest 100 and of their radio coverage from network planning data 220, provided for example by a network operation and management function.

Reference numeral 225 denotes a geographic position locating system, like for example the GPS, which the mobile communication terminals 110, equipped with a GPS receiver, are adapted to exploit for determining their location within the area of interest.

Preferably, the mobile communication terminals 110 have short-range wireless, e.g. radio communication capabilities, for example they are equipped with a Bluetooth interface, a ZigBee interface, a HomeRF interface, an IR interface or the like, by means of which they can directly communicate with neighbor mobile communication terminals, or other local apparatuses, located in a range of distances up to a hundred meters.

FIG. 3 pictorially shows the architecture of RASD communication protocol, according to an embodiment of the present invention. The lowermost levels of the protocol stack (particularly, the first and second layers of the OSI stack, i.e.

the physical and connection layers) are implemented at the RASD controller node 215 (block 305-c), at the generic RASD transceiver station 205 (block 305-s) and at the mobile communication terminal 110 (block 305-t); the RASD protocol further comprises a RASD control protocol layer (third level of the OSI stack) that is implemented at the RASD controller node 215 (block 310-c) and at the mobile communication terminal 110 (block 310-t). The specific implementation of the lowermost protocol layers, particularly at the mobile communication terminal and at the generic RASD transceiver station, is not per se limitative; in particular, for the implementation of the physical layer, one of the existing RATs may be exploited, for example the GSM (which establishes, for every radio channel, a bandwidth equal to 200 KHz), or a dedicated RASD radio layer may be defined.

According to an embodiment of the present invention, the information provided by the RASD controller node 215 to the RASD transceiver stations 205 for being broadcast through the geographic area of interest 100 include the type of available RATs (e.g., GSM, GSM/GPRS, GSM/GPRS/EDGE, UMTS FDD, UMTS TDD, IEEE 802.11a/b/g, CDMA2000, IS-95). For each RAT, the RASD controller node 215 further provides an indication about the area of coverage of said RAT.

According to a preferred embodiment of the present invention, the indications about the area of coverage of each of the existing RATs, which indications are broadcast through the area of interest over the RASD channel, are provided in the form of data, in respect of each of the existing RATs, from which data the area of coverage of the corresponding RAT can be derived, such as for example the coordinates (latitude and longitude) of a center of an imaginary circle representing the area of coverage of that RAT, and a measure of the circle radius (e.g., in meters or other length units), or the coordinates (latitude and longitude) of two corners along a diagonal of an imaginary rectangle representing the area of coverage of the RAT, or the coordinates (latitude and longitude) of the vertexes of an imaginary polygon representing the area of coverage of the RAT. These indications about coverage define respective areas of coverage, by the respective RATs, that may overlapped with one another, because in a given zone of the geographic area of interest two or more RATs may be present.

In this way, the amount of data to be broadcast over the RASD channel, and thus the RASD channel bandwidth requirements, are relatively limited, particularly compared to a solution according to which the geographic area of interest is subdivided in zones, and for each zone the information is broadcast about the RATs available in that zone. Indeed, repeating, for every zone into which the geographic area of interest is subdivided (the size of which has to be relatively small) the information about which RATs are available therein leads to a great redundancy, especially in the case of systems which, like the GSM and the UMTS, have a wide area coverage (in these cases, the same information "GSM" or "UMTS" has to be repeated for every one of the several zones that make up the area of coverage of the GSM or UMTS systems).

The structure of a generic RASD protocol message according to an embodiment of the present invention is depicted in FIG. 4. The RASD protocol message, globally denoted 400, includes: a field 405 ("MESSAGE_TYPE") intended to contain an indication of the type of message; a field 410 ("MESSAGE_SCOPE") intended to contain a value specifying whether the message is a broadcast message (value "BROADCAST"), directed to all the mobile communication terminals, or a singlecast message (value "SINGLECAST"), directed to a specific mobile communication terminal; an optional field 415 ("UE_ID") present in case the value contained in the field 410 specifies that the message is a singlecast message, and intended to contain an identifier of the mobile communication terminal to which the message is directed; and a field 420 ("SPECIFIC_DATA") intended to contain information content of the message 400.

In the following, referring to FIG. 5, a camping algorithm according to an embodiment of the present invention will be described, allowing a mobile communication terminal 110 to connect to one of the RATs available in the area 210 covered by the generic RASD transceiver station 205 and in which the mobile communication terminal 110 is located. It is assumed that the mobile communication terminal 110 is a multi-mode handset, capable of operating with multiple different RATs; it is also assumed that the mobile communication terminal is reconfigurable, i.e. its radio communication functionalities can be reprogrammed, depending on the RAT to which the terminal has to connect, and that, in case the operative software modules necessary for the terminal reprogramming are not available at the terminal, the terminal is capable of downloading the necessary operative software modules "Over The Air" ("OTA").

The RASD controller node 215 periodically starts a coverage information broadcast procedure (block 501) to send to each RASD transceiver station 205 information related to the radio coverage of the different RATs in the respective area 210; the information is included in a "COVERAGE INFORMATION" message, a broadcast message which the RASD transceiver stations 205 broadcast through the respective areas 210.

The "COVERAGE INFORMATION" message has the general structure depicted in FIG. 4, and the "SPECIFIC_DATA" field 420 includes one or more blocks ("COVERAGE INFORMATION BLOCK"s or "CIB"s), one for each RAT; the structure of the generic "CIB" is schematically shown in FIG. 6: the "CIB" 600 includes up to six fields 605, 610, 615, 620, 625 and 627. The field 605 ("RAT_TYPE") is intended to contain an indication about the type of RAT; for example, the "RAT_TYPE" field 605 may contain a value selected from the list of values "GSM", "GSM/GPRS", "GSM/GPRS/EDGE", "UMTS FDD", "UMTS TDD", "IEEE 802.11a/b/g", "CDMA2000", "IS-95"; the field 610 ("COVERAGE_EXT") is intended to contain a value specifying whether the considered RAT covers the whole area 210 of the considered RASD transceiver station 205 (value "GLOBAL"), or the RAT only covers a portion of the area 210 (value "LOCAL"). The field 615 ("COVERAGE_AREA") is optional, and is present only if the value contained in the "COVERAGE_EXT" field 610 is equal to "LOCAL"; the "COVERAGE_AREA" field 615 is intended to contain data adapted to specify the area of coverage of the considered RAT; for example, as mentioned in the foregoing, the coverage area may be expressed as an imaginary circle, in which case the "COVERAGE_AREA" field 615 includes three sub-fields 630 ("CENTER_LAT"), 635 ("CENTER_LONG") and 640 ("RADIUS"): the sub-fields 630 and 635 are intended to contain indications related to the coordinates (latitude and longitude) of the center of an imaginary circle used to define the area of coverage of the respective RAT, and the field 640 is intended to contain a measure (e.g., in meters) of the radius of the imaginary circle. The field 620 ("OPERATOR_ID") is intended to contain an identifier of the telecom operator managing that RAT. The field 625 ("RF_BAND") is intended to contain an indication of the frequency band assigned to the considered RAT; the "RF_BAND" field 627 may include three sub-fields 645 ("INIT_FREQ"), 650 ("FINAL_FREQ") and 655 ("CH_BAND"): the sub-fields 645 and 650 are intended to contain values indicating the initial and final frequencies (e.g., in KHz) of the frequency band assigned to the RAT, whereas the field 655 is intended to contain a value specifying the bandwidth (e.g., in KHz) of each channel assigned to the considered RAT. The field 625 ("PRIORITY") is intended to contain a value specifying a priority assigned to the considered RAT; the priority values specified in these fields of the "CIB"s 600 may be used to determine the order of the "CIB"s 600 in the "COVERAGE INFORMATION" message, so that "CIB"s 600 relating to RATs having a higher priority precedes "CIB"s 600 relating to RATs having a lower priority.

The RASD controller node 215 may for example send a "COVERAGE INFORMATION" message with a predetermined periodicity (for example, assuming to use the first and second layers of the GSM, every 480 ms) In case the time period selected for the broadcasting is not sufficient to send the whole "COVERAGE INFORMATION" message, the RASD controller node 215 may delay the transmission of the next "COVERAGE INFORMATION" message of as many multiples of the selected time period as is necessary to complete the sending of the whole "COVERAGE INFORMATION" message.

Figure 5:
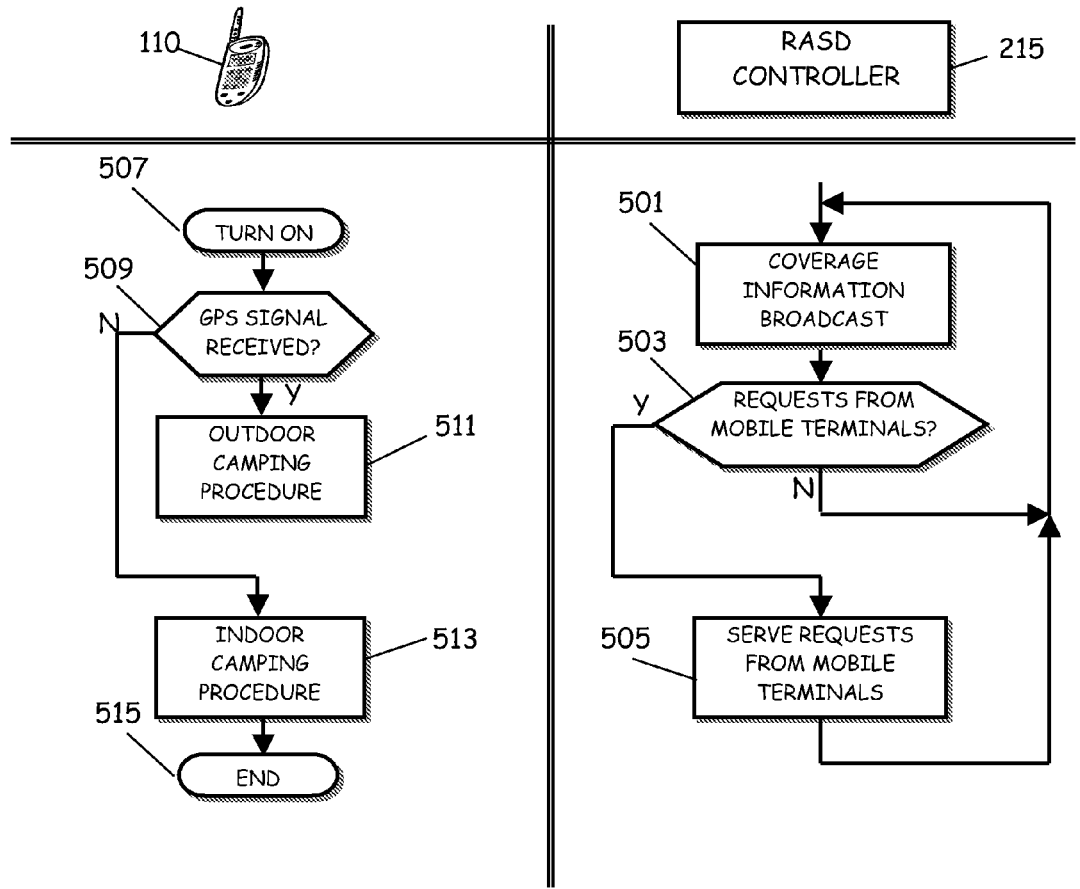
FIG. 5 is a schematic flowchart showing the main steps of a mobile terminal camping procedure according to an embodiment of the present invention.

Back to FIG. 5, the RASD controller node 215 listens for requests received from the mobile communication terminals (block 503), and, in case requests are received (exit branch Y of block 503), the requests are served (block 505).). Otherwise (exit branch N of block 503) the RASD controller node 215 starts the coverage information broadcast procedure again (block 501).

According to the present invention, the camping algorithm is adapted to handle situations in which the mobile communication terminal is not capable of ascertaining its geographic position, for example because, being in an indoor environment, the GPS signal is not received by the mobile communication terminal.

In particular, when the generic mobile communication terminal 110 is turned on (block 507), it ascertains whether it receives the GPS signal (block 509); in the affirmative case (exit branch Y of block 509), which typically occurs when the mobile communication terminal is located outdoor, the mobile communication terminal 110 starts an outdoor camping procedure (block 511), otherwise (exit branch N of block 509), if the mobile communication terminal does not receive the GPS signal, which typically occurs when the mobile communication terminal is located indoor, the mobile communication terminal 110 starts an indoor camping procedure (block 513); the camping procedure then ends (block 515).

The outdoor and indoor camping procedures are described in detail in the following, with the help of the schematic flowcharts of FIG. 7 and FIGS. 8A, 8B and 8C, respectively.

Figure 7:
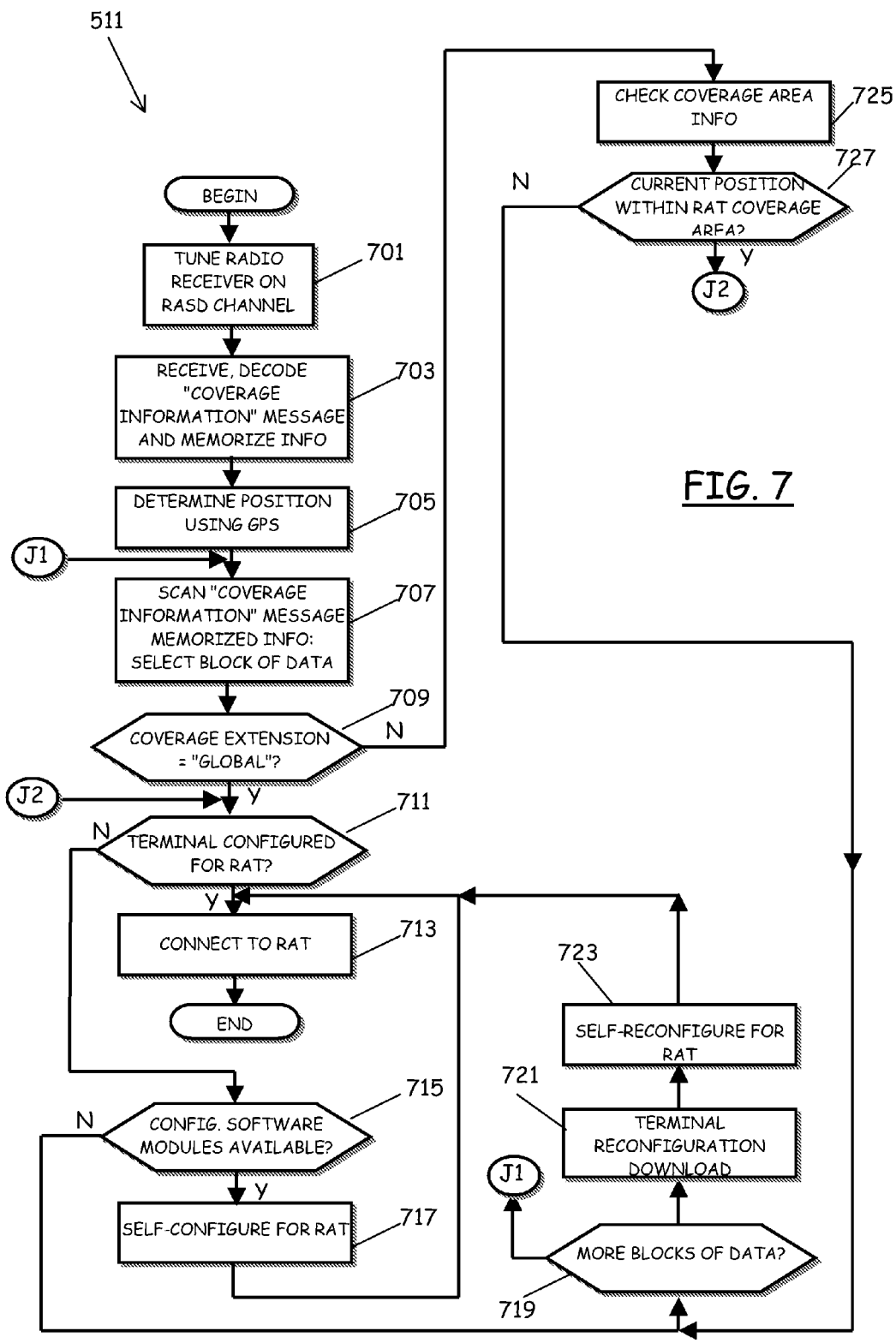
FIG. 7 is a schematic flowchart showing the main steps of an outdoor camping procedure part of the camping procedure of FIG. 5, in an embodiment of the present invention.

Referring to FIG. 7, in the outdoor camping procedure, the mobile communication terminal 110 tunes its radio receiver on the RASD channel transmitted by the RASD transceiver station 205 covering the area where the terminal 110 is located (block 701).

The mobile communication terminal 110 receives the "COVERAGE INFORMATION" message that is broadcast by the RASD transceiver station 205, and decodes the information content thereof; the information contained in the one or more "CIB"s 600 of the received "COVERAGE INFORMATION" message are memorized (block 703).

The mobile communication terminal 110 then determines its location, exploiting the GPS signal (block 705).

Then, the mobile communication terminal 110 starts scanning the "CIB"s 600 that were included in the received "COVERAGE INFORMATION" message (block 707).

Starting from the first "CIB" 600, the mobile communication terminal 110 checks whether the value contained in the "COVERAGE_EXT" field 610 is equal to "GLOBAL" (block 709), meaning that the corresponding RAT of the examined "CIB" 600 covers the whole area 210; in the affirmative case, the mobile communication terminal 110 checks whether it is configured for the RAT specified in the "RAT_TYPE" field 605 of the examined "CIB" 600 (block 711), in which case (exit branch Y of block 711) the mobile communication terminal 110 connects to the RAT (block 713), and the outdoor camping procedure ends. In a preferred embodiment, the mobile communication terminal 110 may check whether the telecom operator indicated by the identifier in the field 620 is one of a list of preferred telecom operators, said list being for example stored in the SIM (Subscriber Identity Module) of the terminal, and, in the affirmative case, the mobile communication terminal may select that RAT, otherwise it can search for another RAT; if eventually no one of the available RATs belongs to a preferred telecom operator, the terminal may select the first available RAT.

If instead the mobile communication terminal 110 is not configured for that RAT (exit branch N of block 711), the terminal ascertains whether it already possesses the necessary operative software modules for self-reconfiguring for that RAT (block 715): in the affirmative case (exit branch Y), the mobile communication terminal 110 self-reconfigures for the specified RAT (block 717), and connects to that RAT (block 713), otherwise (exit branch N of block 715), if there are further "CIB"s 600 (block 719, exit branch Y) the terminal selects the next "CIB" 600, relating to another RAT, and repeats the above actions, whereas if there are no further "CIB"s 600 (block 719, exit branch N), the mobile communication terminal 110 starts a terminal reconfiguration download procedure (block 721) for downloading the software modules necessary for reconfiguring it for working with the highest-priority RAT (block 723), and then it connects to that RAT (block 713).

Back to block 709, if the value contained in the "COVERAGE_EXT" field 610 is equal to "LOCAL" (exit branch N), meaning that the considered RAT does not cover the whole area 210, the mobile communication terminal 110 checks the "COVERAGE_AREA" field 615, where indications are provided adapted to determine the area of coverage of that RAT within the area 210 where the mobile terminal is located (block 725). Exploiting for example the data specifying the coordinates of the center and the radius of the imaginary circle expressing the RAT coverage area, the mobile communication terminal 110 determines the RAT coverage area. The mobile communication terminal 110 then determines whether its current position (determined in block 705 exploiting the GPS signal) is within the RAT coverage area (block 727). In the affirmative case, the mobile communication terminal 110 performs the same actions described above and schematized by blocks 711 to 723; if instead the mobile communication terminal 110 assesses that its current position is not within the RAT coverage area (exit branch N of block 727), the mobile communication terminal 110 moves to the next memorized "CIB" 600 (block 707), if any (exit branch Y of block 719), and examines it in the same way just described, or it starts the terminal reconfiguration download procedure (block 721), to be described later, and then connects to the highest-priority RAT (block 723).

Figure 8A:
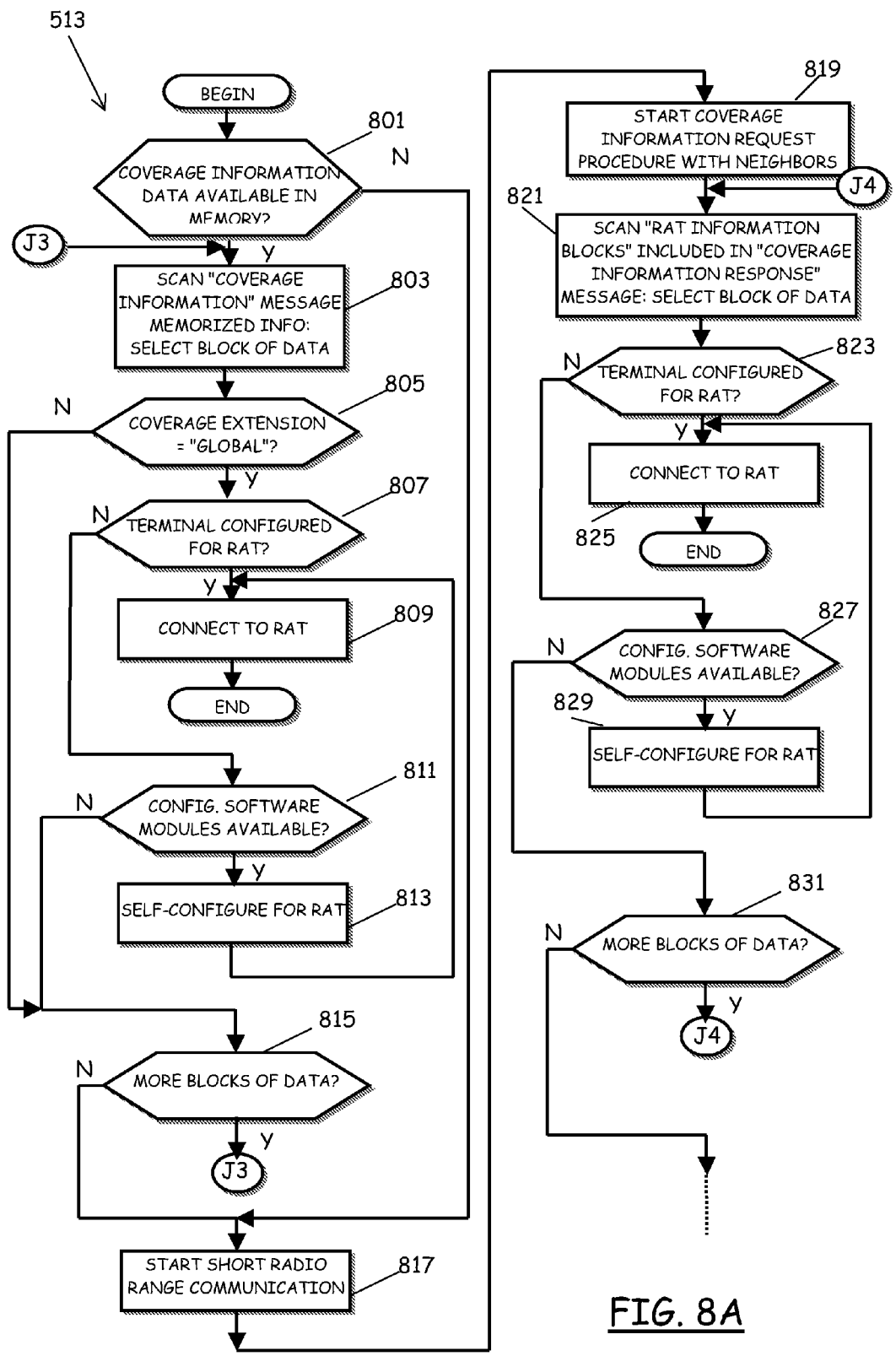
FIGS. 8A, 8B and 8C are a schematic flowchart showing the main steps of an indoor camping procedure part of the camping procedure of FIG. 5, in an embodiment of the present invention.
Figure 8B:
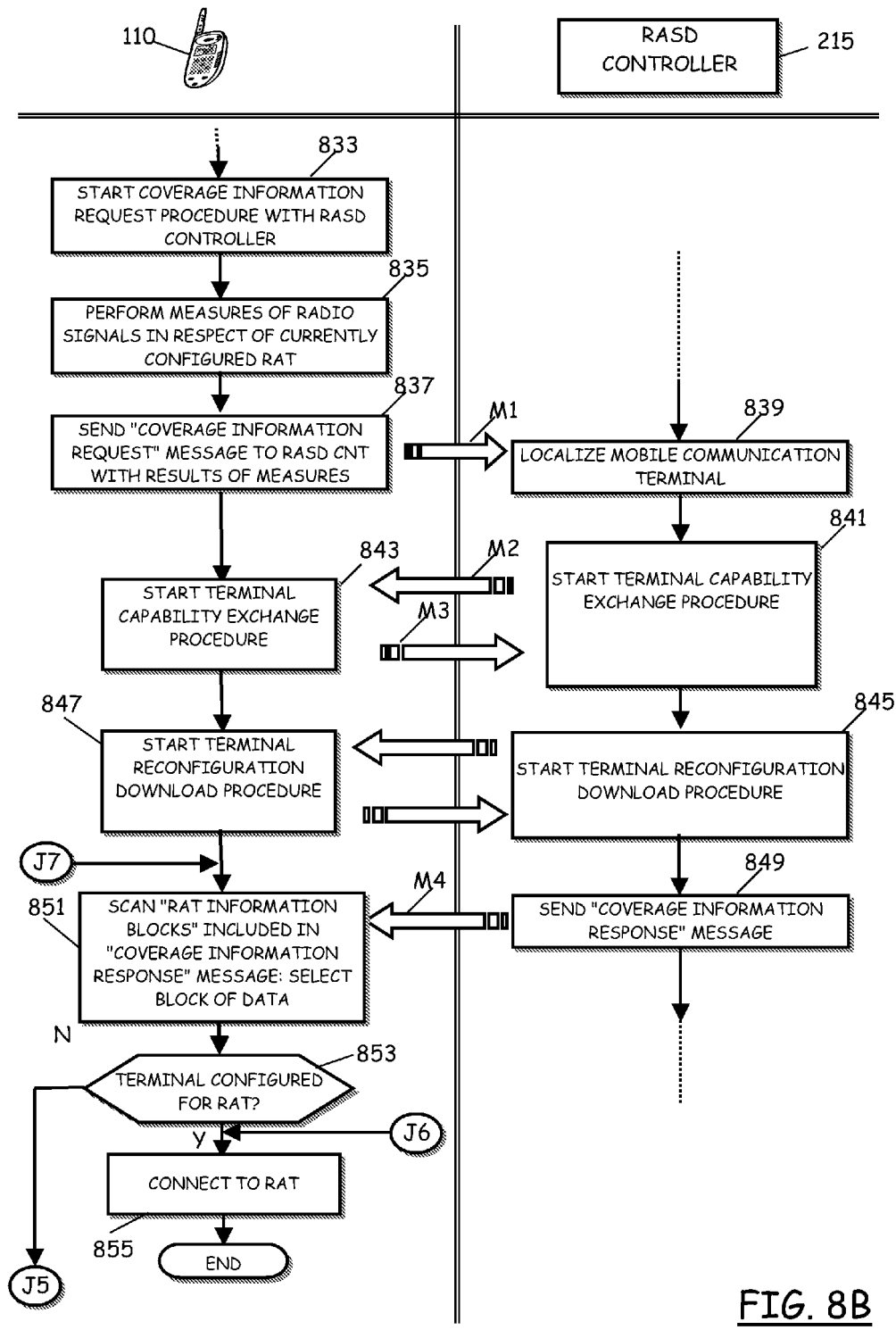
Figure 8C:
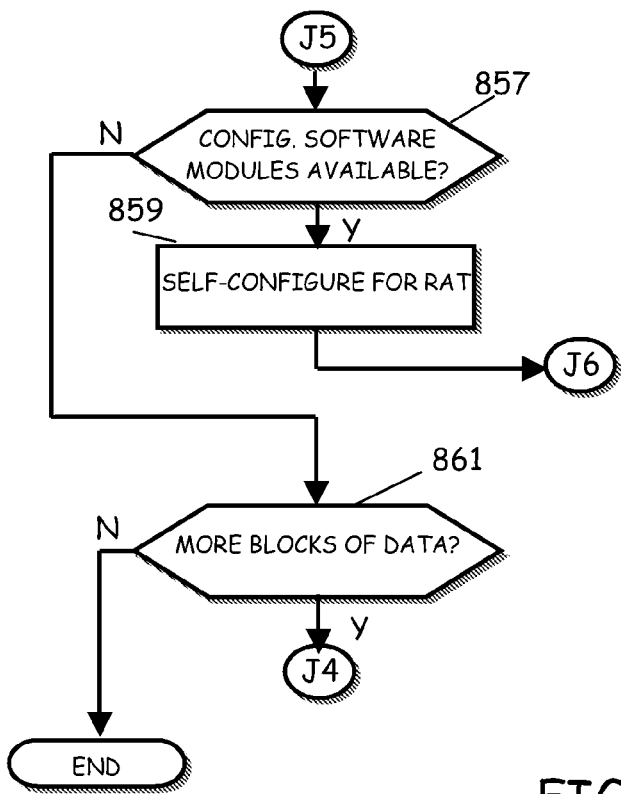

An indoor camping procedure according to a preferred but not limitative embodiment of the present invention is schematized in the flowchart of FIGS. 8A, 8B and 8C. After assessing that there is no GPS signal, the mobile communication terminal 110 checks whether in its memory there are available coverage information data that were received with a previous "COVERAGE INFORMATION" message (block 801) (received before having been turned off. In the affirmative case (exit branch Y), the mobile communication terminal 110 starts scanning the "CIB"s 600 that are stored in its memory (block 803). Starting from the first one of the stored "CIB"s 600, the mobile communication terminal 110 checks whether the value contained in the "COVERAGE_EXT" field 610 is equal to "GLOBAL" (block 805); in the affirmative case (exit branch Y), the mobile communication terminal 110 checks whether it is configured for the RAT specified in the "RAT_TYPE" field 605 of the examined "CIB" 600 (block 807), in which case (exit branch Y of block 807) the mobile communication terminal 110 connects to the RAT (block 809), and the indoor camping procedure ends. If instead the mobile communication terminal 110 is not configured for that RAT (exit branch N of block 807), it ascertains whether it already possesses the necessary software modules for self-reconfiguring for the RAT (block 811: in the affirmative case (exit branch Y), the mobile communication terminal 110 self-reconfigures for the specified RAT (block 813), and connects to the RAT (block 809), otherwise (exit branch N of block 811), if there are further "CIB"s 600 (block 815, exit branch Y) it selects the next "CIB" 600, relating to another RAT, and repeats the above actions.

Similarly, if the value contained in the "COVERAGE_EXT" field 610 is equal to "LOCAL" (exit branch N of block 805), and there are further "CIB"s 600, the mobile communication terminal selects the next "CIB" 600, and repeats the above actions.

In other words, when the mobile communication terminal cannot determine its position, because for example the GPS signal is missing, if the mobile terminal, based on the information received at a previous time over the RASD channel, ascertains that there is a RAT globally covering the area 210 where it is located, it tries to connect to that RAT, whereas it does not try to connect to a RAT which does not cover the whole area 210, but only a portion thereof, because the case may be that the mobile terminal is not in the portion of the area 210 covered by that RAT.

If there are no further "CIB"s 600 (block 815, exit branch N), or no coverage information data are available in its memory (exit branch N of block 801), the mobile communication terminal 110 starts a short-range radio communication session, for attempting to establish a communication with neighboring mobile communication terminals, from which it can get the missing or updated coverage information data (block 817).

As soon as the mobile communication terminal 110 receives a response from a neighboring mobile terminal, it ignores possible further responses received from other neighboring mobile terminals, and starts a coverage information request procedure with the mobile terminal that responded (block 819).

According to an embodiment of the present invention, the coverage information request procedure calls for the mobile communication terminal 110 sending a "COVERAGE INFORMATION REQUEST" message to the neighboring mobile terminal that responded to the short-range radio communication request.

Figure 9:
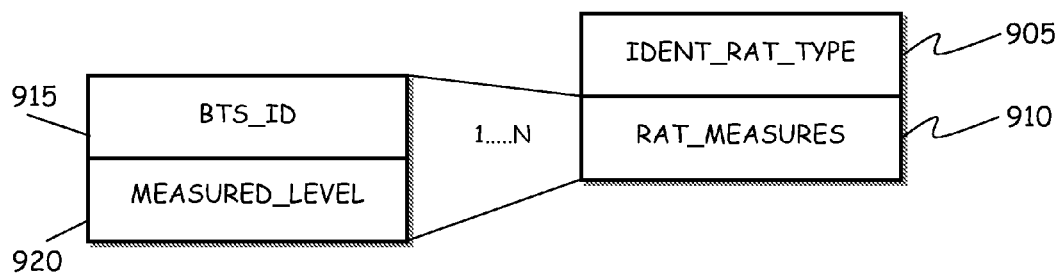
FIG. 9 schematically shows the structure of a portion of a second type of message of the communication protocol according to an embodiment of the present invention.

The "COVERAGE INFORMATION REQUEST" message has the general structure depicted in FIG. 4, and the "SPECIFIC_DATA" field 420, schematically depicted in FIG. 9, comprises a field 905 ("IDENT_RAT_TYPE") intended to contain an indication of the RAT identified by a mobile communication terminal, and a field 910 ("RAT_MEASURES") intended to contain the list of measures performed by a mobile communication terminal on the radio signal level of the RAT specified in the field 905. Each one of the information elements of the field 910 (one information element for each measure) is made up of a field 915 ("BTS_ID") intended to contain an identifier of the RAT transceiver station in respect of which the measure has been performed, and a field 920 ("MEASURED_LEVEL") intended to contain the value resulting from the measure conducted on the transceiver station specified in the field 915. The "COVERAGE INFORMATION REQUEST" message sent by the mobile communication terminal 110 that starts the coverage information request procedure has all the fields set to an undefined value (these data are not necessary to the neighboring mobile terminal).

The neighboring mobile terminal that receives the "COVERAGE INFORMATION REQUEST" message from the mobile communication terminal 110 replies thereto sending back a "COVERAGE INFORMATION RESPONSE" message.

Figure 10:
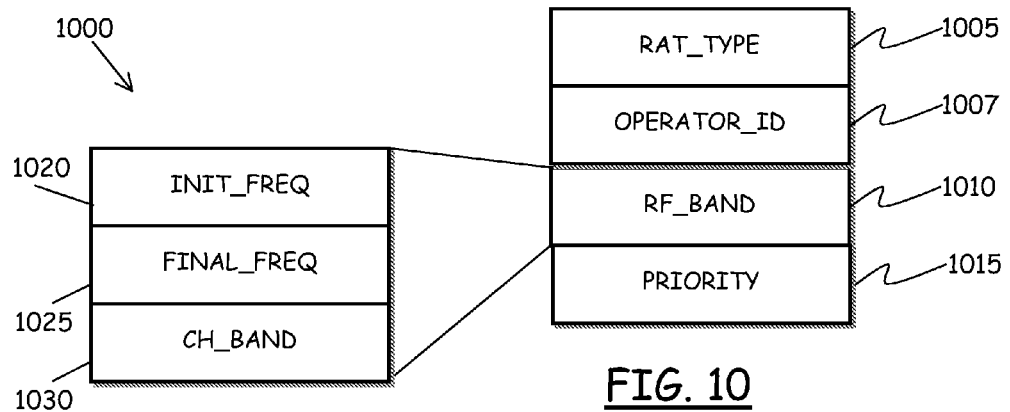
FIG. 10 schematically shows the structure of a portion of a third type of message of the communication protocol according to an embodiment of the present invention.

The "COVERAGE INFORMATION RESPONSE" message is a singlecast message that has the general structure depicted in FIG. 4; the "SPECIFIC_DATA" field 420 includes a field intended to contain a list of one or more "RIB"s ("RAT INFORMATION BLOCKS") that are included in the message. The structure of the generic "RIB" 1000 is depicted in FIG. 10; it includes a field 1005 ("RAT_TYPE") intended to contain an indication about the type of RAT ("GSM", "GSM/GPRS", "GSM/GPRS/EDGE", "UMTS FDD", "UMTS TDD", "IEEE 802.11a/b/g", "CDMA2000", "IS-95"); a field 1007 ("OPERATOR_ID") is intended to contain an identifier of the telecom operator managing that RAT; a field 1010 ("RF_BAND") intended to contain an indication of the frequency band assigned to the considered RAT; the "RF_BAND" field 1010 may include three sub-fields 1020 ("INIT_FREQ"), 1025 ("FINAL_FREQ") and 1030 ("CH_BAND"): the sub-fields 1020 and 1025 are intended to contain values indicating the initial and final frequencies (e.g., in KHz) of the frequency band assigned to the RAT, whereas the field 1030 is intended to contain a value specifying the bandwidth (e.g., in KHz) of each channel assigned to the considered RAT. A field 1025 ("PRIORITY") is intended to contain a value specifying a priority assigned to the considered RAT. Within the "SPECIFIC_DATA" field 420 of the "COVERAGE INFORMATION RESPONSE" message, the different "RIB"s 1000 are preferably ordered according to a decreasing priority value.

If the neighboring mobile communication terminal that responded to the short-range radio communication session started by the considered mobile communication terminal 110 has the available information, it fills the fields of the "COVERAGE INFORMATION RESPONSE" message.

The mobile communication terminal 110, upon receiving the "COVERAGE INFORMATION RESPONSE" message from the neighboring mobile terminal, checks whether the field containing the list of "RIB"s included in the message, and, if said list is not empty, it starts scanning the list of "RIB"s. The first "RIB" 1000 is selected (which corresponds to the RAT being assigned the highest priority) (block 821). The mobile communication terminal 110 checks whether it is configured for the RAT specified in the "RAT_TYPE" field 1005 of the examined "RIB" 1000 (block 823), in which case (exit branch Y of block 823) the mobile communication terminal 110 connects to that RAT (block 825), and the outdoor camping procedure ends. In a preferred embodiment, the mobile communication terminal 110 may check whether the telecom operator indicated by the identifier in the field 620 is one of a list of preferred telecom operators, said list being for example stored in the SIM (Subscriber Identity Module) of the terminal, and, in the affirmative case, the mobile communication terminal may select that RAT, otherwise it can search for another RAT; if eventually no one of the available RATs belongs to a preferred telecom operator, the terminal may select the first available RAT. If instead the mobile communication terminal 110 is not configured for that RAT (exit branch N of block 823), it ascertains whether it already possesses the necessary software modules for self-configuring for the RAT (block 827): in the affirmative case (exit branch Y), the mobile communication terminal 110 self-configures for the specified RAT (block 829), and connects to the RAT (block 825), otherwise (exit branch N of block 827), if there are further "RIB"s 1000 (block 831, exit branch Y) it selects the next "RIB" 1000, relating to another RAT, and repeats the above actions.

If there are no further "RIB"s 1000 in the "COVERAGE INFORMATION RESPONSE" message received by the neighboring mobile terminal, or if the field containing the list of "RIB"s included in the message indicates that said list is empty, or if no response to the short-range radio communication request is received (block 831, exit branch N), the mobile communication terminal 110 starts a coverage information request procedure with the RASD controller node 215 (block 833).

The mobile communications terminal 110 firstly performs measures on the radio signal level in respect of the RAT for which it is currently configured (block 835).

The mobile communication terminal 110 then sends to the RASD controller node 215 a "COVERAGE INFORMATION REQUEST" message (M1 in the drawing) over the RASD channel (block 837); in the "COVERAGE INFORMATION REQUEST" message sent by the mobile communication terminal 110, the fields 905 and 910 are set to contain the type of the RAT for which the terminal is currently configured, and the results of the measures performed by the mobile terminal. In particular, the mobile communication terminal 110 compiles the "COVERAGE INFORMATION REQUEST" placing, in the field 905 ("IDENT_RAT_TYPE"), an indication of the RAT identified by a mobile communication terminal, and in the field 910 ("RAT_MEASURES") the list of measures performed by the mobile communication terminal 110 on the radio signal level of the RAT specified in the field 905; in particular, for each measure, the mobile communication terminal places in the field 915 ("BTS_ID") the identifier of the RAT transceiver station in respect of which the measure has been performed, and in the field 920 ("MEASURED_LEVEL") the value resulting from the measure conducted on the transceiver station specified in the field 915.

The RASD controller node 215 receives the "COVERAGE INFORMATION REQUEST" message, and exploits the information included therein to localize the mobile communication terminal 110 (block 839); any localization technique may be exploited, for example a triangulation technique. Once the RASD controller node 215 has localized the mobile communication terminal 110, it starts a terminal capability exchange procedure (block 841). The terminal capability exchange procedure involves sending to the mobile communication terminal 110 a "CAPABILITY INFORMATION REQUEST" message (M2 in the drawing); "CAPABILITY INFORMATION REQUEST" message is a singlecast message that has the general structure depicted in FIG. 4; the "SPECIFIC_DATA" field 420 is void.

Upon receipt of the "CAPABILITY INFORMATION REQUEST" message, the mobile communication terminal 110 enters the terminal capability exchange procedure (block 843); the mobile communication terminal 110 compiles a "CAPABILITY INFORMATION RESPONSE" message (M3 in the drawing) to be sent back to the RASD controller node 215.

Figure 11:
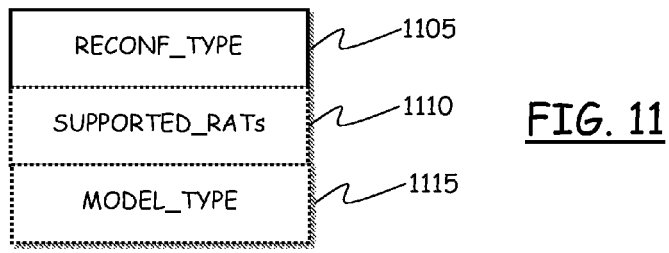
FIG. 11 schematically shows the structure of a portion of a fourth type of message of the communication protocol according to an embodiment of the present invention.

The "CAPABILITY INFORMATION RESPONSE" message is a singlecast message that has the general structure depicted in FIG. 4; the "SPECIFIC_DATA" field 420 has the structure depicted in FIG. 11; it includes a field 1105 ("RECONF_TYPE") intended to contain a value indicating the possible reconfigurations supported by the mobile communication terminal 110; the value contained by the field 1105 may be "MULTI-MODE", indicating that the mobile communication terminal 110 is a multi-mode terminal and can be reconfigured in different operation modes (i.e., for working with different RATs); "SOFTWARE", indicating that the mobile communication terminal can be software-reconfigured in order to change mode; "ANY", indicating that the mobile communication terminal 110 supports both the previous two configuration types. A field 1110 ("SUPPORTED_RATs"), present in case the value contained in the field 1105 is "MULTI-MODE" or "ANY", specifies the RAT supported by the terminal; this field can for example take the values "GSM", "GSM/GPRS", "GSM/GPRS/EDGE", "UMTS FDD", "UMTS TDD", "IEEE 802.11a/b/g", "CDMA2000", "IS-95" a field 1115 ("MODEL_TYPE") is intended to contain an indication of the type of the mobile communication terminal 110, and is present in case the value contained in the field 1105 is "MULTI-MODE" or "ANY".

Let it be assumed that the "CAPABILITY INFORMATION RESPONSE" message that the mobile communication terminal 110 sends to the RASD controller node 215 has the "RECONF_TYPE" field 1105 set to "ANY", the "SUPPORTED_RATs" field 1110 set to "GSM", and the "MODEL_TYPE" field 1115 specifying the model of the terminal 110.

Upon receipt of the "CAPABILITY INFORMATION RESPONSE" message, the RASD controller node 215 starts a terminal reconfiguration download procedure (block 845), for sending to the mobile communication terminal 110 the software modules for connecting to, in the considered example, the GSM RAT.

Figure 15:
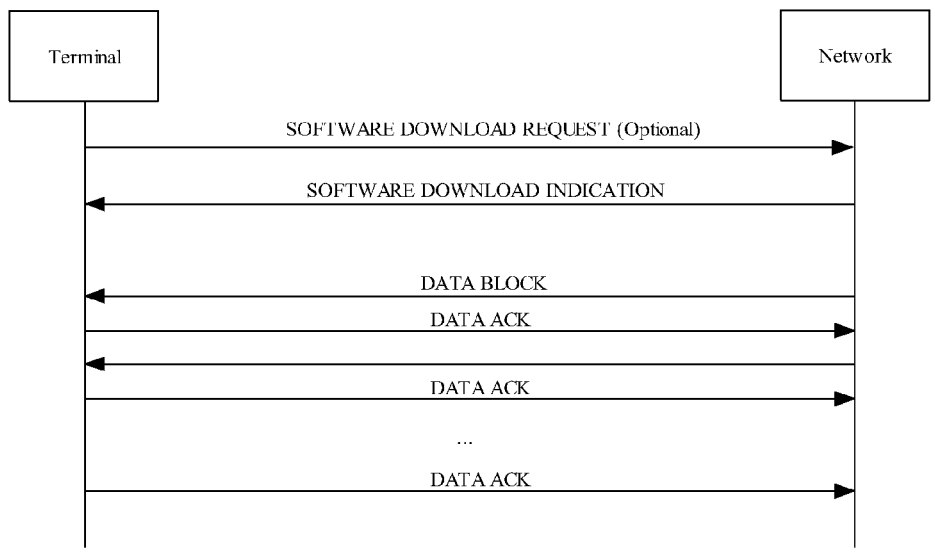
FIG. 15 is a signaling diagram schematically showing the messages exchanged during a procedure of download of software modules for reconfiguring a mobile terminal, in an embodiment of the present invention.

The terminal reconfiguration download procedure calls for sending to the mobile communication terminal 110 "SOFTWARE DOWNLOAD INDICATION" messages and "DATA BLOCK" messages, as schematically depicted in the signaling diagram of FIG. 15.

Figure 12:
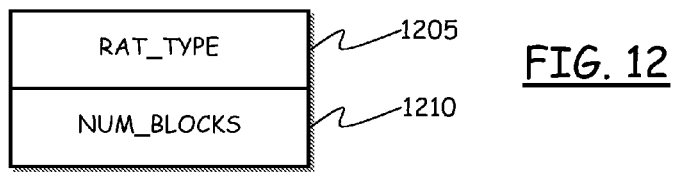
FIG. 12 schematically shows the structure of a portion of a fifth type of message of the communication protocol according to an embodiment of the present invention.

The "SOFTWARE DOWNLOAD INDICATION" message is a singlecast message having the general structure depicted in FIG. 4. The "SPECIFIC_DATA" field 420 has the structure depicted in FIG. 12; it includes a field 1205 ("RAT_TYPE") intended to contain a value indicating the RAT supported by the software modules that are being downloaded (the values of the "RAT_TYPE" field 1205 may for example be "GSM", "GSM/GPRS", "GSM/GPRS/EDGE", "UMTS FDD", "UMTS TDD", "IEEE 802.11a/b/g", "CDMA2000", "IS-95"), and a field 1210 ("NUM_BLOCKS") whose content indicates the number of radio blocks that will be sent; the value contained in the "NUM_BLOCKS" field is used by the mobile communication terminal to determine the size of a reception window.

Figure 13:
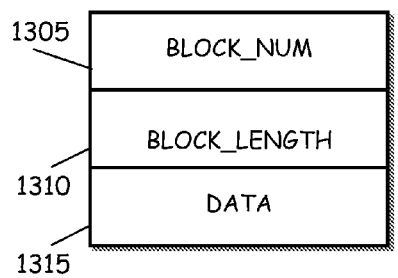
FIG. 13 schematically shows the structure of a portion of a sixth type of message of the communication protocol according to an embodiment of the present invention.

The "DATA BLOCK" message is a singlecast message having the general structure depicted in FIG. 4. The "SPECIFIC_DATA" field 420 has the structure depicted in FIG. 13; it includes a field 1305 ("BLOCK_NUM") intended to contain a value indicating the sequence number of the radio block contained in a field 1315 ("DATA"); a field 1310 ("BLOCK_

LENGTH") intended to contain a value indicating the size (e.g., in Bytes) of the field 1315; the field 1315 contains the data of the radio block.

Upon receipt of the first "SOFTWARE DOWNLOAD INDICATION" message from the RASD controller 215, the mobile communication terminal 110 starts the terminal reconfiguration download procedure (block 847).

Figure 14:
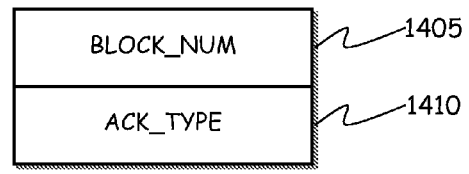
FIG. 14 schematically shows the structure of a portion of a seventh type of message of the communication protocol according to an embodiment of the present invention.

The mobile communication terminal 110 responds to the messages received from the RASD controller 215 by sending thereto "DATA ACK" messages, for acknowledging or not acknowledging the receipt of the messages from the RASD controller node. The "DATA ACK" messages have the general structure depicted in FIG. 4, and wherein the "SPECIFIC_DATA" field 420 has the structure depicted in FIG. 14: it includes a field 1405 ("BLOCK_NUM") intended to contain the sequence number of the radio block acknowledged, and a field 1410 intended to contain an indication of whether the receipt of that radio block has been acknowledged or not.

Once the terminal reconfiguration download procedure is completed, the RASD controller node 215, knowing the location of the mobile communication terminal 110, creates and sends to the mobile communication terminal 110 a "COVERAGE INFORMATION RESPONSE" message (M4 in the drawing), including in the message field intended to contain the RIB list the information related to the RATs present in the area where the mobile terminal 110 is located (block 849).

The mobile communication terminal 110, upon receiving the "COVERAGE INFORMATION RESPONSE" message, starts scanning the list of "RIB"s. The first "RIB" 1000 is selected (which corresponds to the RAT being assigned the highest priority) (block 851). The mobile communication terminal 110 checks whether it is configured for the RAT specified in the "RAT_TYPE" field 1005 of the examined "RIB" 1000 (block 853), in which case (exit branch Y of block 853) the mobile communication terminal 110 connects to that RAT (block 855), and the indoor camping procedure ends. In a preferred embodiment, the mobile communication terminal 110 may check whether the telecom operator indicated by the identifier in the field 620 is one of a list of preferred telecom operators, said list being for example stored in the SIM (Subscriber Identity Module) of the terminal, and, in the affirmative case, the mobile communication terminal may select that RAT, otherwise it can search for another RAT; if eventually no one of the available RATs belongs to a preferred telecom operator, the terminal may select the first available RAT. If instead the mobile communication terminal 110 is not configured for that RAT (exit branch N of block 853), it ascertains whether it already possesses the necessary software modules for self-configuring for the RAT (block 857): in the affirmative case (exit branch Y), the mobile communication terminal 110 self-configures for the specified RAT (block 859), and connects to the RAT (block 855), otherwise (exit branch N of block 857), if there are further "RIB"s 1000 (block 861, exit branch Y) it selects the next "RIB" 1000, relating to another RAT, and repeats the above actions, until a RAT is found which the mobile communication terminal can use.

The present invention is applicable in general in any heterogeneous radio communication context, including contexts in which DSA techniques are implemented, according to which, for example, a telecom operator is free to exploit the licensed band, partitioning it into sub-bands, which can be assigned to a same or to different RATs. With DSA techniques, the network configuration can be quite variable, for example depending on traffic load in the different systems. In situations where one of the systems of the heterogeneous context is congested (since the number of requests exceeds the available radio resources), unused radio resources, for example free carriers, of adjacent network cells (belonging to the same system or to a different system) could be used. For example, the methods for reconfiguring the BTSs of the GSM system and for the carriers allocation described in the published International application WO 2006/064302 may be adopted. In that case, the network entity managing the network radio resources (i.e., the Radio Resource Management—RRM server) may provide to the RASD controller node 215 the information related to the spectrum allocation and to the respective RATs, so that the RASD controller node can inform the mobile communication terminals of changes in the network radio configuration. The generic mobile communication terminal, based on the information received from the RASD controller node over the RASD channel, can access one of the RATs available in the area where it is located, without having to worry about how the RATs are dynamically re-allocated.

The invention can be also applied in heterogeneous radio communication contexts where more than one telecom operator are present. Exploiting the information received from the RASD controller node over the RASD channel, the mobile communication terminal, instead of scanning the whole spectrum for detecting which frequencies are licensed to and managed by the telecom operator it is subscribed to, can get that information directly, reducing the time needed for the camping. Once the frequencies of the telecom operator it has subscribed to have been identified, the mobile communication terminal can proceed as described above for determining to which RAT to connect.

The RASD channel may be an "out-band" channel or an "in-band" channel. In the first case, it is a channel in a frequency band external to the licensed bands assigned to the telecom operators; any radio transport technology may be exploited for the communication over the RASD channel, possibly one of the RATs of the heterogeneous network. In the second case (in-band channel), a frequency band within the licensed band assigned to a telecom operator may be dedicated to the RASD channel; alternatively, to avoid depriving the telecom operator of one of the assigned frequencies, the RASD channel may be implemented as a "logical" channel (for example, new protocol messages to be sent over already existing channels like the BCCH, the PBCCH, the CPICH should be introduced in the standards, or a brand new common logic control channel might be set up).

The present invention has been here described making reference to an exemplary embodiment thereof. Those skilled in the art will readily appreciate that several modifications to the described embodiments are possible, as well as different embodiments, for example in order to satisfy contingent needs, all within the scope of the invention defined in the appended claims.

For example, instead of the GPS, different geographic position locating systems may be used like for example Assisted GPS, Galileo, Glonass,

The invention claimed is:

1. A method for enabling connection of a mobile communication terminal to a radio communication network, comprising:
receiving information about radio access networks available in a geographic area;
determining a current location of the mobile communication terminal within said geographic area;
based on the received information and the determined mobile communication terminal current location, determining available radio access networks covering the current mobile communication terminal location; and attempting to establish a connection to the radio communication network through a selected one of said available radio access networks, and when the current location of the mobile communication terminal within said geographic area cannot be determined:

attempting to establish a direct connection with a neighboring mobile communication terminal over a short-range wireless communication channel;

obtaining from the neighboring mobile communication terminal information about available radio access networks; and attempting to establish a connection to the radio communication network through a selected one of the available radio access networks specified in the information obtained from the neighboring mobile communication terminal.

2. The method of claim 1, wherein said short-range wireless communication channel is a short-range radio channel selected from Bluetooth, ZigBee, HomeRF and IR communication channel.

3. The method of claim 1, wherein said information about available radio access networks available in a geographic area is received over a broadcast communication channel, said broadcast communication channel comprising at least one of:

an out-band broadcast communication channel located in a frequency band external to licensed bands assigned to the radio access networks present in said geographic area of interest; or an in-band broadcast communication channel located in a frequency band within licensed bands assigned to the radio access networks present in said geographic area of interest.

4. The method of claim 1, wherein obtaining from the neighboring mobile communication terminal information about available radio access networks comprises:

obtaining, for each of the available radio access networks, an indication of a type of the radio access technology of the radio access network, and an indication of a frequency band used by the radio access network.

5. The method of claim 1, further comprising:

prior to attempting to establish a direct connection with a neighboring mobile communication terminal over a short-range wireless communication channel, ascertaining a presence, in a memory of the mobile communication terminal, of previously received information about available radio access networks, and attempting to establish a connection with the radio communication network through a selected one of the available radio access networks specified in the previously received information.

6. The method of claim 1, further comprising:

when obtaining from the neighboring mobile communication terminal information about available radio access networks fails, contacting a network function in the radio communication network to get information about the available radio access networks covering the current mobile communication terminal location.

7. The method of claim 6, further comprising:

responsive to contacting a network function in the radio communication network, having the network function:

determining the mobile communication terminal current location within the geographic area;

determining the available radio access networks covering the current mobile communication terminal location; and sending to the mobile communication terminal information about the determined available radio access networks.

8. The method of claim 1, wherein attempting to establish a connection with the radio communication network comprises:

when the mobile communication terminal is not configured for operation with the selected radio access network, re-configuring the mobile communication terminal, wherein re-configuring the mobile communication terminal comprises downloading by air, data for the re-configuring of the mobile communication terminal.

9. The method of claim 1, wherein said information about available radio access networks comprises an identifier of at least one radio access network available in said geographic area, and, associated with said identifier of the at least one radio access network, data indicating an extent of coverage of the geographic area by said at least one radio access network.

10. The method of claim 9, wherein said data comprise at least one among of:

geographic coordinates of at least one geographic point in said geographic area, and an indication of length; or geographic coordinates of at least two geographic points in the geographic area, defining a vertex of a polygon describing the extent of coverage of the geographic area.

11. The method of claim 10, wherein said geographic coordinates of at least one geographic point define a geographic position of a center of a circle, and said indication of length defines a radius of the circle, said circle describing the extent of coverage of the geographic area by that radio access network.

12. The method of claim 9, wherein, when the radio access network covers the whole geographic area, said data comprises an indication that the radio access network covers the whole geographic area.

13. The method of claim 9, wherein said identifier of the radio access network is in the form of a string of characters.

14. A mobile communication terminal configured to:

receive information about radio access networks of a radio communication network, available in a geographic area;

determine a current location of the mobile communication terminal within said geographic area;

based on the received information and the determined current location, determine available radio access networks covering the current location, and attempt to establish a connection to the radio communication network through a selected one of said available radio access networks; and wherein when the current location of the mobile communication terminal within said geographic area cannot be determined, the mobile communication terminal is further configured to:

attempt to establish a direct connection with a neighboring mobile communication terminal over a short-range wireless communication channel;

obtain from the neighboring mobile communication terminal information about available radio access networks; and attempt to establish a connection to the radio communication network through a selected one of the available radio access networks specified in the information obtained from the neighboring mobile communication terminal.

15. The mobile communication terminal of claim 14, wherein said short-range wireless communication channel is a short-range radio channel selected from Bluetooth, ZigBee, HomeRF, and IR communication channel.

16. The mobile communication terminal of claim 14, wherein the mobile communication terminal comprises a position determining device.

17. The mobile communication terminal of claim 14, wherein, in order to obtain from the neighboring mobile communication terminal information about available radio access networks, the mobile communication terminal is further configured to:

obtain, for each of the available radio access networks, an indication of a type of radio access technology of the radio access network, and an indication of a frequency band used by the radio access network.

18. The mobile communication terminal of claim 14, configured to:

prior to an attempt to establish a direct connection with a neighboring mobile communication terminal over a short-range radio channel, ascertain a presence, in a memory of the mobile communication terminal, of previously received information about available radio access networks, and attempt to establish a connection with the radio communication network through a selected one of the available radio access networks specified in the previously received information.

19. The mobile communication terminal of claim 14, further configured to:

when obtaining from the neighboring mobile communication terminal information about available radio access networks fails, contact a network function in the radio communication network to get information about the available radio access networks covering the current mobile communication terminal location.

20. The mobile communication terminal of claim 14, wherein, to attempt to establish a connection to the radio communication network, the mobile communication terminal is further configured to:

when the mobile communication terminal is not configured for operation with the selected radio access network, re-configure the mobile communication terminal, wherein, for re-configuring, the mobile communication terminal is further configured to download by air, data for the re-configuring of the mobile communication terminal.

21. A radio communication network comprising a network device configured to broadcast information about radio access networks available in a geographic area covered by the radio communication network, wherein said network device is further configured to:

receive from a first mobile communication terminal a request of providing information about available radio access networks covering the current mobile communication terminal location;

provide the first mobile communication terminal with the requested information about available radio access networks;

establish a connection to a second radio communication terminal through one of the available radio access networks specified in the information provided to the first mobile communication terminal, wherein the second radio communication terminal is in a neighborhood of the first radio communication terminal and establishes a direct connection with the first radio communication terminal over a short-range wireless communication channel.

22. The radio communication network of claim 21, wherein said information about available radio access networks comprises an identifier of at least one radio access network available in said geographic area, and, associated with an indication or identifier of the at least one radio access network, data indicating an extent of coverage of the geographic area by said at least one radio access network.

23. The radio communication network of claim 22, wherein said data comprise at least one of:

geographic coordinates of at least one geographic point in the geographic area, and an indication of length; or geographic coordinates of at least two geographic points, defining a vertex of a polygon describing extent of coverage of the geographic area.

24. The radio communication network of claim 23, wherein said geographic coordinates of at least one geographic point define a geographic position of a center of a circle, and said indication of length defines a radius of the circle, said circle describing the extent of coverage of the geographic area by said radio access network.

25. The radio communication network of claim 21, wherein said network device is further configured to:

determine the mobile communication terminal current location within the geographic area;

determine the available radio access networks covering the current mobile communication terminal location; and send to the mobile communication terminal information about the determined available radio access networks.

* * * * *